(12) United States Patent
Takezawa et al.

(10) Patent No.: US 7,425,386 B2
(45) Date of Patent: Sep. 16, 2008

(54) ELECTRODE GROUP FOR BATTERY AND NON-AQUEOUS ELECTROLYTE SECONDARY BATTERY USING THE SAME

(75) Inventors: Hideharu Takezawa, Katano (JP); Shuji Tsutsumi, Ikoma (JP); Mikinari Shimada, Yawata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 583 days.

(21) Appl. No.: 10/664,879

(22) Filed: Sep. 22, 2003

(65) Prior Publication Data
US 2004/0062982 A1    Apr. 1, 2004

(30) Foreign Application Priority Data
Sep. 30, 2002    (JP)    ............... 2002-285844

(51) Int. Cl.
H01M 2/18    (2006.01)
H01M 6/10    (2006.01)
H01M 2/26    (2006.01)

(52) U.S. Cl. .................. 429/130; 429/94; 429/211
(58) Field of Classification Search .............. 429/130
See application file for complete search history.

(56) References Cited
FOREIGN PATENT DOCUMENTS

| | | | |
|---|---|---|---|
| EP | 1 049 180 A1 | 11/2000 |
| EP | 1 089 370 A1 | 4/2001 |
| GB | 2 324 404 A | 4/1997 |
| JP | 05-182691 | 7/1993 |
| JP | 11-273739 | 10/1999 |
| JP | 11273739 A | * | 10/1999 |

\* cited by examiner

*Primary Examiner*—Jonathan Crepeau
*Assistant Examiner*—Robert Hodge
(74) *Attorney, Agent, or Firm*—McDermott Will & Emery LLP (57) ABSTRACT

An electrode group for a battery including a positive electrode and a negative electrode wound into a spiral with a separator interposed therebetween, wherein the positive electrode includes a positive electrode current collector and positive electrode material mixture layers formed on both sides of the positive electrode current collector, the negative electrode includes a negative electrode current collector and negative electrode material mixture layers formed on both sides of the negative electrode current collector, a lead is connected to at least one of the positive electrode current collector and the negative electrode current collector, and at least one of step portions having difference in level formed in the electrode group by lengthwise ends of the positive electrode, the negative electrode and the separator and the periphery of the lead, respectively, is covered with an insulating member arranged on an inner circumference side or an outer circumference side of a turn of the electrode group.

2 Claims, 5 Drawing Sheets

F I G. 4  PRIOR ART

ELECTRODE GROUP FOR BATTERY AND NON-AQUEOUS ELECTROLYTE SECONDARY BATTERY USING THE SAME

BACKGROUND OF THE INVENTION

In accordance with recent development of portable and wireless electronic equipment, there is an increasing demand for a compact and lightweight secondary battery of high energy density that serves as a power source for driving the electronic equipment. To meet such demand, non-aqueous electrolyte secondary batteries which are compact, lightweight and capable of quick charging and have high energy density have been developed. Among those, a prevailing one is a lithium ion rechargeable battery.

A typical non-aqueous electrolyte secondary battery includes a spiral electrode group formed by winding a positive electrode, a negative electrode and a separator interposed therebetween, a non-aqueous electrolyte and a battery case for housing the electrode group and the non-aqueous electrolyte. The positive electrode includes a current collector made of aluminum and a positive electrode material mixture layer formed on the aluminum current collector. As a positive electrode active material, a lithium-containing transition metal compound such as $LiCoO_2$ is used. On the other hand, the negative electrode includes a current collector made of copper and a negative electrode material mixture layer formed on the copper current collector. As a negative electrode active material, a carbon material is used, for example. This battery utilizes intercalation-deintercalation of lithium ions into and from the electrodes and is designed so that the positive and negative electrodes are opposed in as large area as possible to allow high rate charge/discharge.

However, as the electronic equipment is provided with more functions and becomes more power-consuming, a battery of much higher capacity and energy density is keenly demanded. Therefore, the separator or the current collector is made thinner to reduce a distance between the positive and negative electrodes and a space within the battery case which does not contribute to the capacity is made small.

In a battery comprising the spiral electrode group and the non-aqueous electrolyte contained in the battery case, expansion of the negative electrode occurs during charge and hence the electrode group is deformed. As a result, the electrodes are locally pressured, producing a region where uniform intercalation-deintercalation of lithium ions cannot be achieved. In such a region, the positive electrode is apt to increase its potential and hence the transition metal in the positive electrode active material is leached out to deposit on the negative electrode during charge/discharge or storage at high temperatures in a charged state. The deposited metal penetrates the separator before long and brings about an internal short circuit. This causes abnormal voltage reduction and leads to a decrease in reliability of the battery.

So far, for example, Japanese Laid-Open Patent Publications Nos. Hei5-182691 and Hei11-273739 have proposed a technique of arranging an ionic insulator between an end of the positive electrode material mixture layer and the negative electrode material mixture layer opposing thereto. This technique is intended to control the charge reaction itself involving the intercalation-deintercalation of lithium ions by the ionic insulator to inhibit the positive electrode potential from locally increasing and prevent the internal short circuit. However, according to this technique, an internal short circuit as described below cannot be prevented because the ionic insulator is arranged between the positive and negative electrode material mixture layers. Further, since the ionic insulator directly covers the positive or negative electrode material mixture layer, the electrode reaction is inhibited and the capacity decreases.

Figure 3:
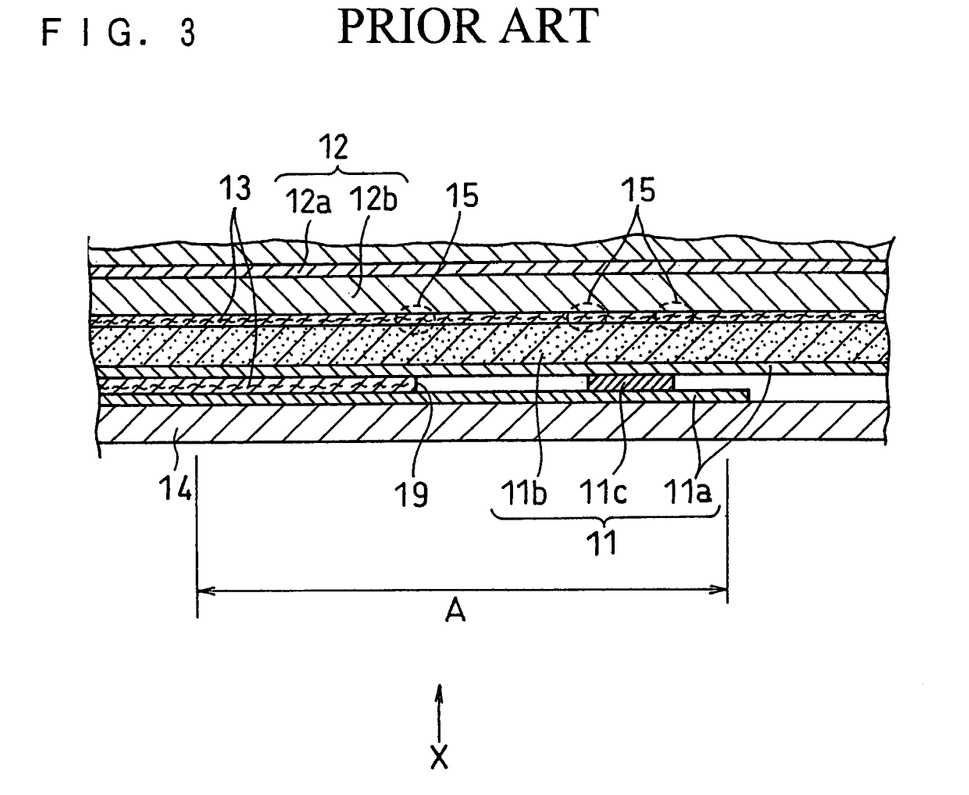
FIG. 3 is a partial horizontal section of an electrode group according to a related art.

FIG. 3 shows a partial sectional view of a spiral electrode group according to a related art.

This figure shows the outermost turn of the electrode group abutting on a battery case 14 and its vicinity. Referring to FIG. 3, a positive electrode current collector 11a of a positive electrode 11 is situated at the outermost turn of the spiral electrode group, both sides of which are exposed. At the second outermost turn, a positive electrode material mixture layer 11b is formed only on an inner circumference side of the positive electrode current collector 11a. A positive electrode lead 11c is welded to the exposed positive electrode current collector 11a at the outermost turn of the electrode group. Further, a lengthwise end 19 (an end in the lengthwise direction) of a separator 13 lies far inside from the positive electrode lead 11c along the turn of the electrode group to allow a certain space therebetween. At the inside of the positive electrode 11 along a radius direction of the electrode group, a negative electrode 12 is arranged with the interposition of the separator 13. As to the negative electrode 12, negative electrode material mixture layers 12b are formed on both sides of a negative electrode current collector 12a even in the vicinity of the outermost turn of the electrode group.

Short circuit regions 15 are generated within the separator between the positive electrode material mixture layer 11b and the negative electrode material mixture layer 12b. The short circuit regions 15 are opposed to step portions having difference in level formed in the electrode group by the lengthwise end 19 of the separator 13 and the periphery of the positive electrode lead 11c, respectively, with the intervention of the positive electrode material mixture layer 11b and the positive electrode current collector 11a. In the electrode group thus configured, regions opposing to the step portions having difference in level may receive local pressure if an internal pressure of the electrode group is increased due to expansion of the negative electrode during charge or the electrode group is pressured by the inner wall of the battery case. In the locally pressured regions, distance between the positive electrode 11 and the negative electrode 12 is reduced and hence the electrode reaction is apt to concentrate thereon. Thereby, the short circuit regions 15 are generated in the separator lying in the reduced space between the electrodes.

Figure 4:
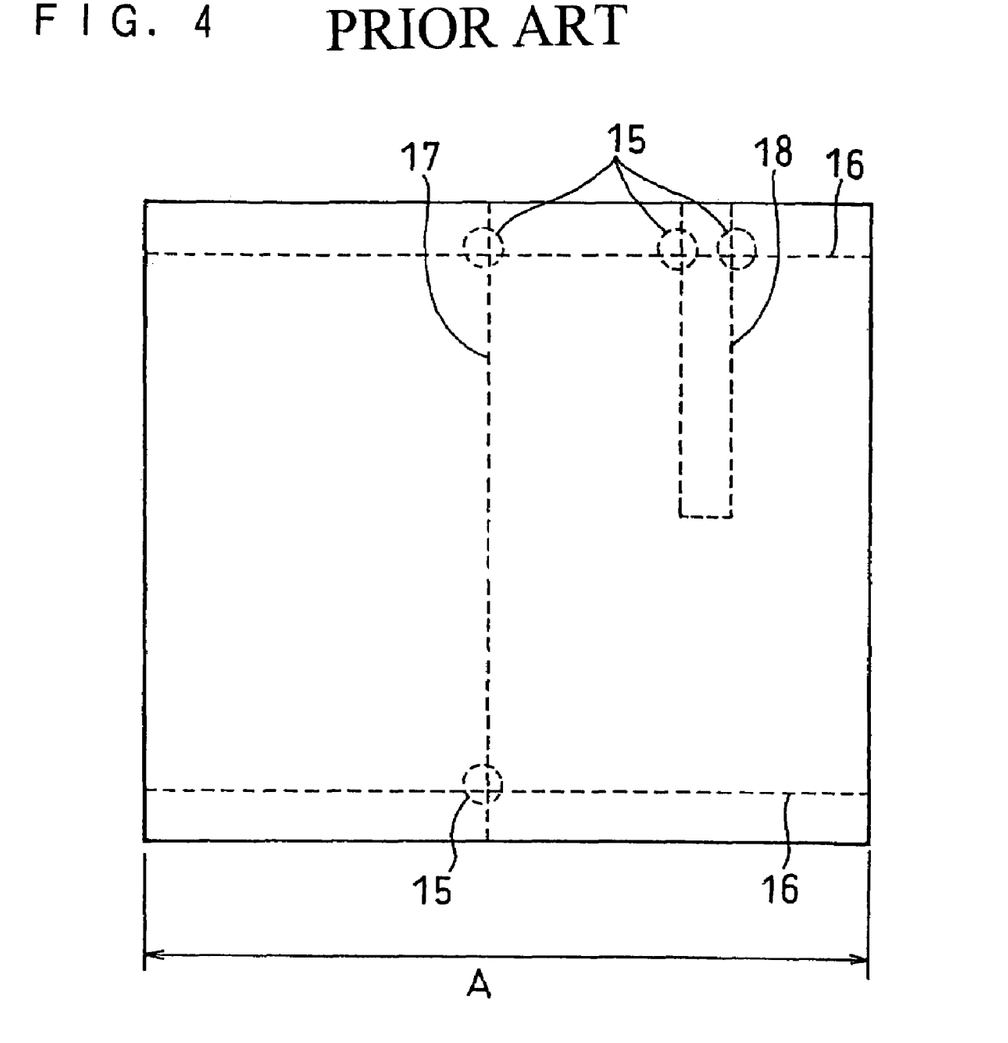
FIG. 4 is a front view of a region A observed in the direction of an arrow X of FIG. 3 including short circuit regions 15 in a negative electrode of the electrode group.

FIG. 4 is a front view observed in the direction of an arrow X in FIG. 3 showing a region A including the short circuit regions 15 in the negative electrode of the electrode group shown in FIG. 3. The width of the negative electrode is a size larger than that of the positive electrode. On boundaries 16 of an area of the positive electrode opposing to the negative electrode, the positive electrode potential is apt to increase locally, thereby the positive electrode active material tends to be leached out. The same is applied to a boundary 17 (lengthwise end) of the separator (not shown) opposing to the region A, as well as a boundary 18 of the positive electrode lead opposing to the region A. The leached positive electrode active material deposits particularly on the negative electrode in a region where the distance between the positive and negative electrodes is small. Therefore, the short circuit regions 15 are most apt to be generated at the points of intersection of the boundaries 16 with the boundary 17 or the boundary 18.

Apparent from the above description, with respect to a non-aqueous electrolyte secondary battery of high energy density, it is necessary to cause the electrode reaction as uniformly as possible and prevent the internal short circuit caused by the leach of the positive electrode active material. Further, it is also necessary to avoid voltage failure in a battery in an initial state and abnormal voltage reduction in a charged battery during storage at high temperatures. The present invention has been achieved in view of these problems.

BRIEF SUMMARY OF THE INVENTION

The present invention relates to an electrode group for a battery comprising a positive electrode and a negative electrode wound into a spiral with a separator interposed therebetween, wherein the positive electrode includes a positive electrode current collector and positive electrode material mixture layers formed on both sides of the positive electrode current collector, the negative electrode includes a negative electrode current collector and negative electrode material mixture layers formed on both sides of the negative electrode current collector, and at least one of step portions having difference in level formed in the electrode group by lengthwise ends of the positive electrode, the negative electrode and the separator, respectively, is covered with an insulating member arranged on an inner circumference side or an outer circumference side of a turn of the electrode group.

Further, the present invention relates to an electrode group for a battery, wherein one of the positive electrode and the negative electrode serving as the outermost turn of the electrode group has: a double side exposed current collector part ranging from the lengthwise end thereof to a predetermined position inside along the winding direction, on both sides of which the positive or negative electrode material mixture layer is not formed; and a single side exposed current collector part continued from the double side exposed current collector part to a predetermined position far inside along the winding direction, only on an inner circumference side of which the positive or negative electrode material mixture layer is formed, the double side exposed current collector part and the single side exposed current collector part opposing at least partially to each other without the interposition of the other of the positive electrode and the negative electrode which does not serve as the outermost turn.

Still further, the present invention relates to an electrode group for a battery comprising a positive electrode and a negative electrode wound into a spiral with a separator interposed therebetween, wherein the positive electrode includes a positive electrode current collector and positive electrode material mixture layers formed on both sides of the positive electrode current collector, the negative electrode includes a negative electrode current collector and negative electrode material mixture layers formed on both sides of the negative electrode current collector, and a lead is connected to at least one of the positive electrode current collector and the negative electrode current collector and at least one of step portions having difference in level formed in the electrode group by the periphery of the lead is covered with an insulating member arranged on an inner circumference side or an outer circumference side of a turn of the electrode group.

The present invention further relates to an electrode group for a battery, wherein one of the positive electrode and the negative electrode serving as the outermost turn of the electrode group has: a double side exposed current collector part ranging from the lengthwise end thereof to a predetermined position inside along the winding direction, on both sides of which the positive or negative electrode material mixture layer is not formed; and a single side exposed current collector part continued from the double side exposed current collector part to a predetermined position far inside along the winding direction, only on an inner circumference side of which the positive or negative electrode material mixture layer is formed, the double side exposed current collector part and the single side exposed current collector part opposing at least partially to each other without the interposition of the other of the positive electrode and the negative electrode which does not serve as the outermost turn, and the lead being connected to the double side exposed current collector part or the single side exposed current collector part.

The insulating member is preferably adhered to a position opposing to the above-described at least one of step portions having difference in level.

Moreover, the present invention relates to a non-aqueous electrolyte secondary battery comprising the above-described spiral electrode group, a non-aqueous electrolyte and a battery case for housing the electrode group and the non-aqueous electrolyte.

With respect to the positive electrode, the negative electrode and the separator for forming the electrode group, a vertical end to the winding direction (lengthwise direction) is referred to as a lengthwise end. On the other hand, an end parallel to the winding direction is referred to as a crosswise end.

The present invention contributes to improvement in productivity and reliability of a non-aqueous electrolyte secondary battery.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

An embodiment of the present invention is described with reference to FIGS. 1 and 2.

Figure 1:
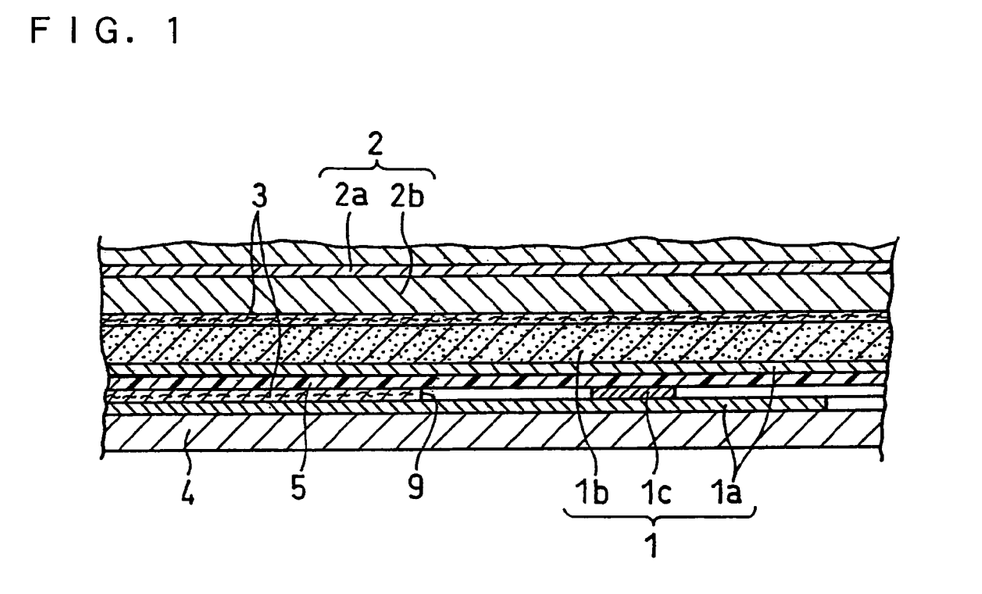
FIG. 1 is a partial horizontal section of an electrode group according to an embodiment of the present invention.

FIG. 1 is a partial section of an example of a spiral electrode group of the present invention.

This electrode group is formed by winding a positive electrode, a negative electrode and a separator interposed therebetween. FIG. 1 illustrates the outermost turn of the electrode group abutting on a battery case 4 and its vicinity. A positive electrode current collector 1a of a positive electrode 1 is situated at the outermost turn of the electrode group, both sides of which are exposed. At the second outermost turn, a positive electrode material mixture layer 1b is formed only on an inner circumference side of the positive electrode current collector 1a. A positive electrode lead 1c is welded to the inner circumference side of the exposed positive electrode current collector at the outermost turn. Further, a lengthwise end 9 (an end in the lengthwise direction) of a separator 3 lies far inside from the positive electrode lead 1c along the turn of the electrode group to allow a certain space therebetween. At the inside of the positive electrode 1 along a radius direction of the electrode group, a negative electrode 2 is arranged with the interposition of the separator 3. As to the negative electrode 2, negative electrode material mixture layers 2b are formed on both sides of a negative electrode current collector 2a even in the vicinity of the outermost turn of the electrode group.

The lengthwise end 9 of the separator 3 and the periphery of the positive electrode lead 1c form step portions having difference in level within the electrode group, respectively. An insulating member 5 is arranged to cover the step portions having difference in level. The insulating member 5 may be interposed between the separator 3 or the positive electrode lead 1c and the positive electrode current collector 1a. However, to give an advantage to the production process, the insulating member 5 is preferably positioned so as to oppose to the step portions having difference in level and adhered to the separator 3 or the positive electrode current collector 1a before winding.

As the insulating member 5, for example, an insulating tape made of a substrate and an adhesive paste may be used. The adhesive paste may be provided on both sides of the substrate, but the paste solely on a single side is enough. Further, the adhesive paste may be spread on the entire surface of one side, but in view of workability, it is preferable to arrange the paste only in a certain region. In view of control of an internal short circuit caused by thermal contraction of the separator in a battery exposed to high temperatures, the insulating member is preferably more heat resistant than the separator. If the insulating member is arranged at the outermost turn, it is sufficient that the insulating member has an electronic insulation property. However, if the insulating member is arranged at a more inside turn, it is preferable that the insulating member additionally has an ionic insulation property.

In general, the lengthwise ends (ends in the lengthwise direction) of the positive electrode, the negative electrode and the separator and the periphery of the lead cause step portions having difference in level in the electrode group, respectively. The number of the insulating member covering the step portions having difference in level is not particularly limited. However, if plural step portions having difference in level are caused on the same turn in the electrode group, it is preferred in view of workability that the step portions having difference in level be covered with a single insulating member. As shown in FIG. 3, short circuit regions are generated on the boundary of an area of the positive electrode opposing to the negative electrode. Accordingly, the width of the insulating member is preferably larger than that of the positive electrode such that the insulating member protrudes from the upper and lower ends of the positive electrode in the electrode group.

The thickness of the insulating member is not limited as long as it can ease the local pressure applied by the step portions having difference in level in the electrode group. For example, the thickness is preferably 10 to 100 µm. If the insulating member is too thin, the effect of inhibiting the internal short circuit may become small. On the other hand, if the thickness is larger than 100 µm, the share of the electrode volume in the space inside the battery case decreases and hence the battery capacity is reduced. If an insulating tape made of a substrate and an adhesive paste is used as the insulating member, it is preferable that the substrate is 10 to 50 µm in thickness and the adhesive paste is 50 to 30 µm in thickness in terms of insulation property, adhesion property and workability.

Examples of a material for the substrate include polyolefin resins such as a polyethylene resin and a polypropylene resin, a polyethylene terephthalate resin, a polyether ether ketone resin, a polyphenylene sulfide resin, a polyarylate resin, a polyamide resin, a polyimide resin, a fluorocarbon resin, etc. These may be used solely or in combination. Modified resins thereof may also be used. A substrate including a filler such as glass fiber, talc, silica, etc. may also be used.

Examples of the adhesive paste include natural rubber, isobutyl rubber, styrene butadiene rubber, silicone rubber, urethane rubber, an acrylic resin, etc. These may be used solely or in combination in the layered form, for example. Modified ones of them may also be used.

As the positive electrode, the negative electrode, the separator and the non-aqueous electrolyte, any of those conventionally known in the field of non-aqueous electrolyte secondary batteries may be used without any particular limitation. That is, there is no particular limitation to the positive electrode current collector, the negative electrode current collector, the positive electrode active material, the conductive agent, the binder and the thickener contained in the positive electrode material mixture layer, the negative electrode active material, the binder and the thickener contained in the negative electrode material mixture layer.

The positive electrode current collector is preferably made of an aluminum foil or a metal foil that is lath-shaped or etched. The positive electrode is prepared by applying a positive electrode material mixture on both sides of the positive electrode current collector, drying the applied material mixture and rolling the resulting electrode. The positive electrode has a thickness of 100 to 200 µm in general and preferably has flexibility as much as possible. The positive electrode material mixture is prepared by kneading the positive electrode active material, the binder, the conductive agent and optionally the thickener with a dispersion medium.

The negative electrode current collector is preferably made of a copper foil or a metal foil that is lath-shaped or etched. The negative electrode is prepared by applying a negative electrode material mixture onto both sides of the negative electrode current collector, drying the applied material mixture and rolling the resulting electrode. The negative electrode has a thickness of 100 to 200 µm in general and preferably has flexibility as much as possible. The negative electrode material mixture is prepared by kneading the negative electrode active material and the binder, and optionally the conductive agent and/or the thickener, with a dispersion medium.

The preparations of the positive and negative electrode material mixtures are not particularly limited. For example, they may be prepared by mixing the raw materials in a planetary mixer, a homomixer, a pinmixer, a kneader, a homogenizer or the like. In preparing the material mixture, dispersing agents, surfactants, stabilizers and the like of various kinds may be added to the raw materials, if necessary. The step of applying the material mixture is not particularly limited. For example, the material mixture may be applied to the current collector using a slit-die coater, a reverse roll coater, a lip coater, a blade coater, a knife coater, a gravure coater, a dip coater or the like. Thereafter, the applied material mixture is allowed to air-drying or similar drying. The drying temperature is preferably 70 to 200° C. in view of productivity. The rolling step is performed using a roll press until the electrode is rolled down to a predetermined thickness.

The thickness of the separator is 10 to 30 µm in general to obtain high energy density with reliability. Also, a non-aqueous solvent, a solute and an additive used for the non-aqueous electrolyte are not particularly limited and those known in the art may be used. Further, the battery case is not particularly limited and those generally used are a cylindrical case, a prismatic case and an elliptic case having a bottom and an opening at the top.

Hereinafter, the present invention is described in detail by way of an example and a comparative example. However, the present invention is not limited thereto.

EXAMPLE 1

Figure 2:
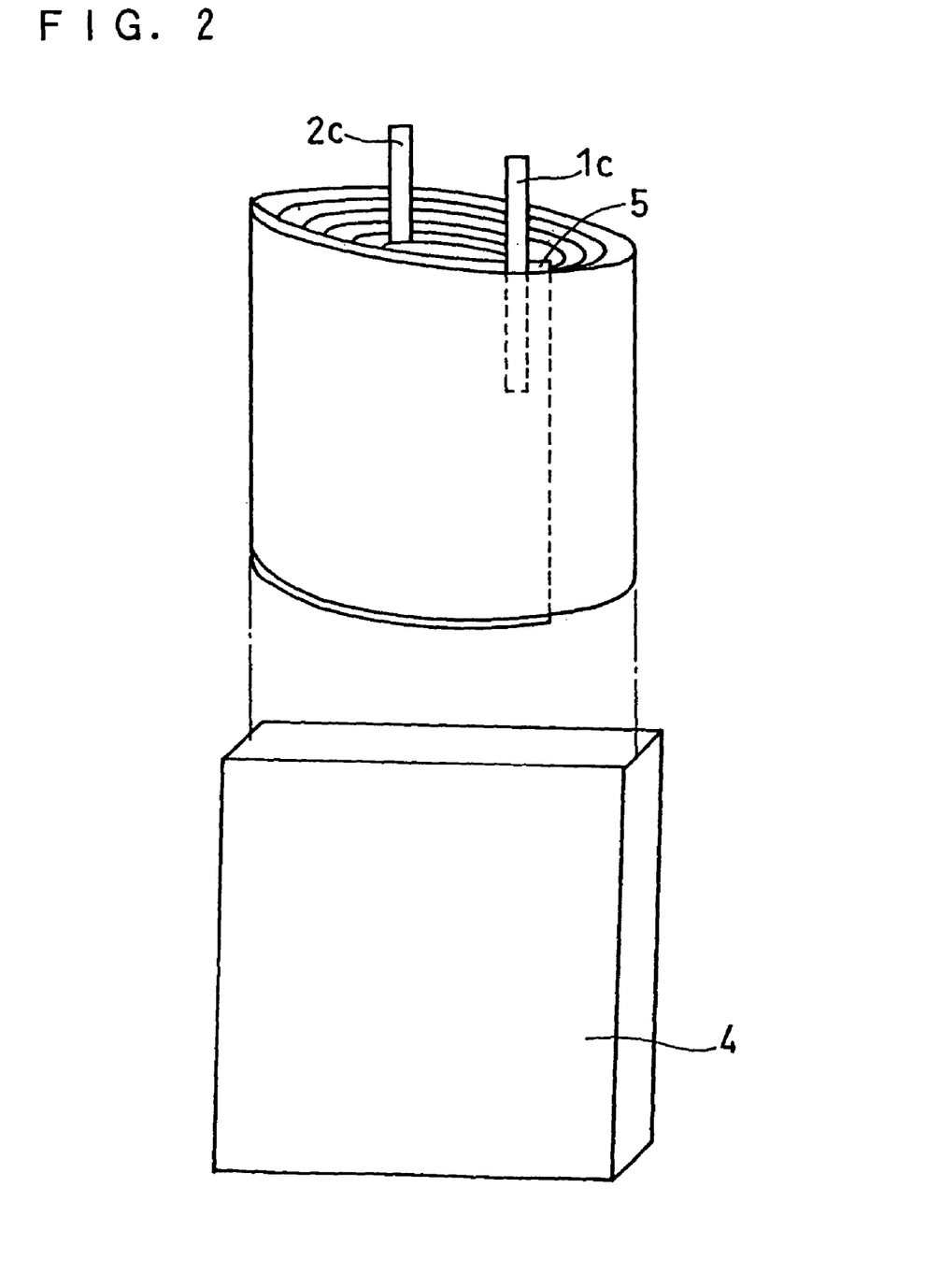
FIG. 2 is a schematic oblique view of an electrode group and a battery case according to the embodiment of the present invention.
Figure 5:
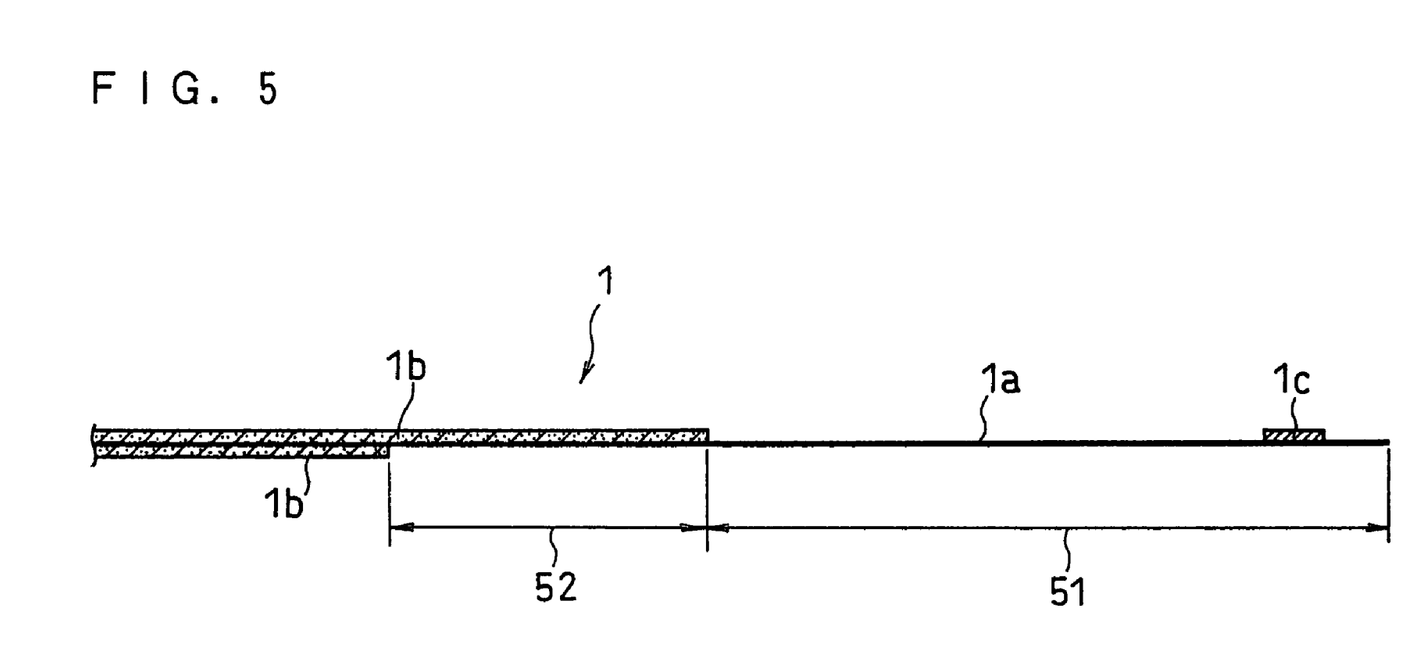
FIG. 5 is a sectional view of a positive electrode of the electrode group according to the embodiment of the present invention.

Explanation is given with reference to FIGS. 1, 2 and 5.

(i) Preparation of Positive Electrode

To prepare a positive electrode material mixture paste, were mixed 100 parts by weight of lithium cobaltate as a positive electrode active material, 3 parts by weight of acetylene black as a conductive agent, 4 parts by weight (in terms of resin) of an aqueous dispersion of polytetrafluoroethylene (PTFE) as a binder and 0.8 parts by weight (in terms of resin) of an aqueous solution of carboxymethyl cellulose as a thickener. This paste was applied onto both sides of a positive electrode current collector 1a made of a belt-shaped aluminum foil of 20 μm in thickness and dried. The resulting electrode was rolled to obtain a positive electrode 1 of 180 μm in thickness.

FIG. 5 shows a sectional view of a lengthwise end portion of the resulting positive electrode 1. In a region ranging from the lengthwise end (an end in the lengthwise direction) to a predetermined position of the positive electrode 1 which would be positioned at the outermost turn of the electrode group, was provided a double side exposed current collector part 51, on both sides of which a positive electrode material mixture layer 1b was not formed. Further, in a region ranging from the end of the double side exposed current collector part 51 to a predetermined position, was provided a single side exposed current collector part 52, on a single side of which the positive electrode material mixture layer 1b was formed.

Then, a single end of a positive electrode lead 1c was spot-welded to the double side exposed current collector part 51 of the positive electrode 1. Thereafter, the positive electrode 1 was dried at 120° c. for 15 minutes.

(ii) Preparation of Negative Electrode

To prepare a negative electrode material mixture paste, were mixed 100 parts by weight of flake graphite as a negative electrode active material, 4 parts by weight (in terms of resin) of an aqueous dispersion of styrene-butadiene rubber (SBR) as a binder and 0.8 parts by weight (in terms of resin) of an aqueous solution of carboxymethyl cellulose as a thickener. This paste was applied onto both sides of a negative electrode current collector 2a made of a belt-shaped copper foil of 14 μm in thickness and dried. The resulting electrode was rolled to obtain a negative electrode 2 of 196 μm in thickness.

In a region ranging from a lengthwise end (an end in the lengthwise direction) of the negative electrode 2 which would be positioned at the innermost turn of the electrode group to a predetermined position, was provided a single side exposed current collector part, on a single side of which a negative electrode material mixture layer 2b was formed. Then, a single end of a negative electrode lead 2c was spot-welded to the single side exposed current collector part. Thereafter, the negative electrode 2 was dried at 110 ° C. for 10 minutes.

(iii) Preparation of Electrode Group

The thus obtained positive and negative electrodes 1 and 2 were wound with the interposition of a 20 mm thick polypropylene separator 3 having heat resistance up to 140° C. such that a cross section thereof has a substantially elliptic form as shown in FIG. 2. Thus, a spiral electrode group was prepared.

(iv) Arrangement of Insulating Member

Then, as shown in FIGS. 1 and 2, an insulating member 5 was arranged on an inner side of the separator 3 between the double side exposed current collector part of the positive electrode positioned at the outermost turn of the electrode group and the single side exposed current collector part of the positive electrode positioned at the second outermost turn. The insulating member 5 was 2 mm greater in width than the positive electrode current collector 1a and hence arranged to protrude by 1 mm from an upper end and a lower end (ends in the widthwise direction) of the positive electrode 1, respectively. As a result, step portions having difference in level formed in the electrode group by the lengthwise end 9 of the separator 3 and the periphery of the positive electrode lead 1c, respectively, were covered completely with the insulating member 5 from the inner side.

In this example, was used as the insulating member an insulating tape comprising a 20 μm thick substrate made of a polyphenylene sulfide resin (having heat resistance up to 200° C.) and a 10 μm thick adhesive layer made of an urethane resin. The insulating tape was adhered to the outer circumference side of the single side exposed current collector part of the positive electrode 1.

(v) Assembly of Battery

The above-described electrode group was accommodated in a prismatic battery case 4 having a bottom and an opening. Another end of the positive electrode lead 1c was connected to an explosion-proof sealing plate and another end of the negative electrode lead 2c was connected to a negative electrode terminal insulated from the sealing plate. Then, the periphery of the sealing plate and the opening end of the battery case 4 were laser-welded.

Then, through an injection hole opened in the sealing plate, a non-aqueous electrolyte was injected into the battery case 4. The non-aqueous electrolyte was prepared by dissolving a solute of lithium hexafluorophosphate ($LiPF_6$) in a concentration of 1.0 mole/L into a solvent mixture of ethylene carbonate and ethyl methyl carbonate in a volume ratio of 1:1. Thereafter, a stopper was inserted in the injection hole and the periphery of the stopper and the sealing plate were laser-welded to seal the battery. Thus, a prismatic lithium ion rechargeable battery (5.3 mm in thickness, 30 mm in width and 48 mm in total height) having nominal capacity of 800 mAh was completed. Additional 99 batteries were fabricated in the same manner.

COMPARATIVE EXAMPLE 1

A prismatic lithium ion rechargeable battery (5.3 mm in thickness, 30 mm in width and 48 mm in total height) having nominal capacity of 800 mAh was fabricated in the same manner as Example 1 except that the insulating member was not provided in the electrode group. Additional 99 batteries were fabricated in the same manner.

[Evaluation]

The batteries of Example 1 and Comparative Example 1 were evaluated as to occurrence rate of internal short circuit immediately after assembly (occurrence rate A: the number of batteries among 100 batteries that caused the internal short circuit) and occurrence rate of internal short circuit after being subjected to a high temperature storage test in a charged state (occurrence rate B: the number of batteries among 10 batteries that caused the internal short circuit). The results are shown in Table 1.

The high temperature storage test was performed on conditions that the batteries were discharged at a constant current of 160 mA up to a final voltage of 3.0 V in a 20° C. environment, followed by constant current/constant voltage charge at a charging current of 80 mA and a charging voltage of 4.2 V. Then, the full-charged batteries were stored in a 80 ° C. atmosphere for a week.

TABLE 1

|  | Occurrence rate A of internal short circuit immediately after assembly | Occurrence rate B of internal short circuit after storage at high temperature |
| --- | --- | --- |
| Example 1 | 0/100 | 0/10 |
| Comparative Example 1 | 25/100 | 7/10 |

Table 1 shows that the occurrence rate of internal short circuit in the batteries of Example 1 was very low both immediately after assembly and after storage at high temperature. On the other hand, the occurrence rate of internal short circuit in the batteries of Comparative Example 1 was very high both immediately after assembly and after storage at high temperature. Such a difference is considered as being caused by the insulating member 5 arranged between the double side exposed current collector part at the outermost turn of the electrode group and the single side exposed current collector part at the second outermost turn of the electrode group. That is, according to Example 1, it is presumed that the insulating member 5 eased the local pressure caused by the step portions having difference in level formed in the electrode group by the lengthwise end (an end in the lengthwise direction) of the separator and the periphery of the positive electrode lead. Thereby, the electrode reaction is caused with improved uniformity and the leach of the positive electrode active material is inhibited, and hence the internal short circuit is prevented.

According to the present invention, as described above, local pressure caused by step portions having difference in level formed in an electrode group is eased and the electrode reaction is caused with improved uniformity. Therefore, the internal short circuit in a battery is prevented. Thus, productivity and reliability of a non-aqueous electrolyte secondary battery of high energy density are improved.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. An electrode group for a battery comprising a positive electrode and a negative electrode wound into a spiral with a separator interposed therebetween, wherein
    said positive electrode includes a positive electrode current collector and positive electrode material mixture layers formed on both sides of said positive electrode current collector,
    said negative electrode includes a negative electrode current collector and negative electrode material mixture layers formed on both sides of said negative electrode current collector,
    one of said positive electrode and said negative electrode serving as the outermost turn of said electrode group has: a double side exposed current collector part ranging from the lengthwise end thereof to a predetermined position inside along the winding direction, on both sides of which the positive or negative electrode material mixture layer is not formed; and a single side exposed current collector part continued from said double side exposed current collector part to a predetermined position inside along the winding direction, only on an inner circumference side of which the positive or negative electrode material mixture layer is formed, said double side exposed current collector part and said single side exposed current collector part opposing at least partially to each other without the interposition of the other of said positive electrode and said negative electrode which does not serve as said outermost turn,
    a lead is connected to said double side exposed current collector part,
    a lengthwise end of said separator lies inside along the winding direction from said lead, and
    a plurality of step portions, at least one of said step portions having difference in level formed in said electrode group by lengthwise ends of said current collector part serving as the outermost turn and said separator, respectively, are covered with an insulating member from an inner side of said electrode group,
    wherein said insulating member is interposed between said separator and said single side exposed current collector part.

2. The electrode group in accordance with claim 1, wherein said insulating member is adhered to an outer circumference side of said single side exposed current collector part opposing to at least one of said step portions having difference in level.

* * * * *